US005739599A

United States Patent [19]

Murai

[11] Patent Number: 5,739,599

[45] Date of Patent: Apr. 14, 1998

[54] ELECTROMAGNETIC ACTUATOR

[75] Inventor: Masakazu Murai, Miyagi, Japan

[73] Assignee: Keihin Corporation, Tokyo, Japan

[21] Appl. No.: 782,115

[22] Filed: Jan. 13, 1997

[51] Int. Cl.$^{6}$ .............................. H02K 33/02; H01F 7/121

[52] U.S. Cl. ................................ 310/14; 310/30; 335/262

[58] Field of Search ...................................... 335/251, 255, 335/262, 263, 281; 310/14, 23, 30, 34

[56] References Cited

U.S. PATENT DOCUMENTS 4,055,823 10/1977 Anderson ................................ 335/255

4,267,897 5/1981 Takeshima .......................... 335/262 X

*Primary Examiner*—Thomas M. Dougherty

*Assistant Examiner*—Judson H. Jones

*Attorney, Agent, or Firm*—Nikaido, Marmelstein, Murray & Oram LLP

[57] ABSTRACT

An electromagnetic actuator includes a bobbin which is disposed between opposite ends of a housing made of a magnetic material and which has a coil wound therearound, a guide sleeve which is fitted to an inner periphery of the bobbin and which is opposed at one end thereof to one of wall ends of the housing and fitted at the other end thereof into a support bore in the other end of the housing, a stationary core fitted into the guide sleeve and caulked to the one end wall of the housing, and a movable core slidably fitted into the guide sleeve and cooperating with the stationary core. In this electromagnetic actuator, an end of the guide sleeve guiding the movable core is placed into close contact with and coupled in a caulked manner to an outer peripheral surface of the stationary core which is caulked and coupled to one of end walls of the magnetic housing. Thus, the coaxiality between the guide sleeve guiding the movable core and the stationary core can be assured despite a side thrust from the movable core.

22 Claims, 10 Drawing Sheets

ELECTROMAGNETIC ACTUATOR

BACKGROUND OF THE INVENTION

1. Field of the Invention

The present invention relates to an electromagnetic actuator including a bobbin which is disposed between opposite end walls of a housing made of a magnetic material and which has a coil wound therearound, a guide sleeve which is fitted to an inner periphery of the bobbin and which is opposed at one end thereof to one of the end walls of the housing and fitted at the other end thereof into a support bore in the other end wall of the housing, a stationary core fitted into the guide sleeve and caulked to the one end wall of the housing, and a movable core slidably fitted into the guide sleeve and cooperating with the stationary core.

2. Description of the Related Art

The guide sleeve in the electromagnetic actuator is an important part for providing a stable reciprocal movement of the movable core, while assuring the coaxiality of the stationary and movable cores. In the conventional electromagnetic actuator, a resilient ring is interposed between opposed surfaces of the stationary core and the guide sleeve in order to provide a coaxiality of the stationary core and the guide sleeve. For this reason, if the guide sleeve receives a side thrust from the movable core, the guide sleeve is inclined by the deformation of the resilient ring and as a result, the coaxiality of the cores may get out of order to cause a variation in operational characteristic of the movable core.

SUMMARY OF THE INVENTION

Accordingly, it is an object of the present invention to provide an electromagnetic actuator of the above-described type, wherein the coaxiality of the stationary and movable cores can be always assured by the guide sleeve to exhibit a stable performance.

To achieve the above object, according to a first aspect and feature of the present invention, there is provided an electromagnetic actuator comprising a bobbin which is disposed between opposite ends of a housing made of a magnetic material and which has a coil wound therearound, a guide sleeve which is fitted to an inner periphery of the bobbin and which is opposed at one end thereof to one of wall ends of the housing and fitted at the other end thereof into a support bore in the other end of the housing, a stationary core fitted into the guide sleeve and caulked to the one end wall of the housing, and a movable core slidably fitted into the guide sleeve and cooperating with the stationary core, wherein the guide sleeve is placed into close contact with an outer peripheral surface of the stationary core and fixedly coupled thereto.

With the first feature of the present invention, the coaxiality of the stationary core and the guide sleeve can be assured despite the side thrust applied to the guide sleeve from the movable core, thus, the coaxiality of both the cores is always kept by the guide sleeve, and the reciprocal movement of the movable core can be guided properly to provide a stable performance. Moreover, it is not necessary to interpose a resilient ring between the stationary core and the guide sleeve as in the conventional electromagnetic actuator and hence, it is possible to reduce the number of parts and in its turn, to simplify the structure.

According to a second aspect and feature of the present invention, in addition to the first feature, the guide sleeve protrudes out of the other end of the housing.

With the second feature of the present invention, the support span of the guide sleeve for the movable core is increased and hence, the reciprocal movement of the movable core can be guided properly.

According to a third aspect and feature of the present invention, in addition to the first or second feature, the guide sleeve is caulked from its outer periphery and coupled to the stationary core.

With the third feature of the present invention, the guide sleeve can be simply and reliably coupled to the stationary core.

According to a fourth aspect and feature of the present invention, in addition to the third feature, an annular groove is defined around the outer periphery of the stationary core, and a caulked projection formed by caulking the guide sleeve from its outer periphery is engaged in the annular groove.

With the fourth feature of the present invention, the guide sleeve can be coupled to the stationary core with a relatively small caulking force and hence, it is possible to avoid the disorder of the coaxiality of the guide sleeve and the stationary core due to the distortion of the guide sleeve and the stationary core.

According to a fifth aspect and feature of the present invention, there is provided an electromagnetic actuator comprising a bobbin which is disposed between opposite ends of a housing made of a magnetic material and which has a coil wound therearound, a guide sleeve which is fitted to an inner periphery of the bobbin and which is opposed at one end thereof to one of wall ends of the housing and fitted at the other end thereof into a support bore in the other end of the housing, a stationary core fitted into the guide sleeve and caulked to the one end wall of the housing, and a movable core slidably fitted into the guide sleeve and cooperating with the stationary core, wherein the housing made by pressing a magnetic steel plate into an angular U-shape has a smaller-diameter support bore and a larger-diameter support bore defined in one and the other of its end walls, respectively, and the guide sleeve is fitted into the larger-diameter support bore and to the inner peripheral surface of the bobbin interposed between both the end walls, the guide sleeve being fixedly coupled to the stationary core which is in close contact with the inner peripheral surface of the end of the guide sleeve, and the stationary core has a small shaft protruding from its outer end, the small shaft being fitted into and caulked in the smaller-diameter support bore and coupled to the one end wall.

With the fifth feature of the present invention, despite a side thrust from the movable core, the coaxiality of both the cores can be of course assured by the guide sleeve, and the disengagement of the guide sleeve and the bobbin from the housing can be inhibited at once by the caulking of the stationary core to the housing, thereby providing an enhancement in assemblability. Further, there is little magnetic loss between the end walls and the sidewall of the housing, which can also contribute to an enhancement in performance.

According to a sixth aspect and feature of the present invention, in addition to one of the first to fifth features, the housing having the opposite end walls is formed by pressing a magnetic steel sheet into an angular U-shape; the bobbin interposed between the opposite end walls ad a coupler housing extending from a peripheral edge of one end of the bobbin to the outside of the housing are integrally formed from a synthetic resin, and coupler terminal connected to the coil wound around the bobbin is disposed within the coupler housing, thereby forming a coupler.

With the sixth feature of the preset invention, there is little magnetic loss, because the housing is formed into the seamless continuous angular U-shape as a whole. This can contribute to an enhancement in attracting force characteristic. Moreover, the insertion of the bobbin into the housing can be performed without interference with the coupler housing, and the mounting of the bobbin can be simply performed by mounting of the stationary core and the guide sleeve. Thus, the electromagnetic actuator can be easily fabricated.

According to a seventh aspect and feature of the present invention, in addition to the sixth feature, the electromagnetic actuator further includes a cover made of synthetic resin and mounted to the angular U-shaped housing to cover the coil by cooperation with the sidewall of the housing.

With the seventh feature of the present invention, it is possible to guard the coil from water and dusts by the cover. There is also an advantage that is the cover is removed, the maintenance of the coil and its connecting portion can be conducted.

According to an eighth aspect and feature of the present invention, in addition to the seventh feature, the cover has a pair of reinforcing plates integrally formed thereon for clamping opposite sides of the coupler housing.

With the eighth feature of the present invention, it is possible to effectively reinforce the coupler by utilizing the cover, whereby the coupler can sufficiently withstand a load of insertion from a power source coupler and a flexural load.

According to an ninth aspect and feature of the present invention, in addition to the eighth feature, the housing is provided with a positioning portion for defining a position of the coupler housing in the housing, and the coupler housing has guide rails formed in opposite sides thereof, so that both the reinforcing plates are slidably engaged with guide rails in a direction of insertion of the housing into the cover.

With the ninth feature of the present invention, the insertion of the housing into the cover can be guided by the engagement of the reinforcing plates with the guide rails in a condition in which the coupler housing has been retained at a given position in the housing. Thus, the mounting of the cover can be easily and properly performed, and the coupler can be reliably reinforced by the reinforcing plates.

According to an tenth aspect and feature of the present invention, in addition to the ninth feature, the cover has a reinforcing corner portion integrally formed thereon, which is fitted over a stepped neck portion of the coupler housing to interconnect both the reinforcing plates.

With the tenth feature of the present invention, the coupler can be more effectively reinforced by cooperation of both the reinforcing plates with the reinforcing corner portion.

According to an eleventh aspect and feature of the present invention, in addition to one of the seventh to tenth features, the cover includes an end wall for covering one end wall of the housing to which the stationary core is caulked and coupled.

With the eleventh feature of the present invention, the entering of rain water or the like from around a caulked/coupled portion of the stationary core to the housing can be prevented by the end wall of the cover.

According to an twelfth aspect and feature of the present invention, in addition to one of the first to fifth features, positioning bore is provided in one end of the housing and a positioning projection is provided on one end face of the bobbin opposed to the one end wall, the positioning bore and the positioning projection being resiliently engaged with each other.

With the twelfth feature of the present invention, when the bobbin is inserted into the housing, the positioning of the bobbin and the housing can be properly performed and moveover, in the positioning, a good moderation feeling can be provided by a force of resilient engagement between the positioning bore and the positioning projection, but also the temporary assembled states of the housing and the bobbin can be maintained.

According to a thirteenth aspect and feature of the present invention, in addition to the twelfth feature, the positioning projection is formed into a bowl-like shape.

With the thirteenth feature of the present invention, when the bobbin is inserted into the housing, the positioning projection can slide on an inner surface of the end wall of the housing, leading to a reduced insertion resistance.

According to a fourteenth aspect and feature of the present invention, in addition to the thirteenth feature, the bowl-like shaped positioning projection is comprised of a tapered portion rising at a steep angle, and a profiled portion of a gentle angle connected to a smaller-diameter end of the tapered portion.

With the fourteen feature of the present invention, when the bobbin is inserted into the housing, the insertion resistance can be alleviated by sliding of the gentle angle profiled portion on the inner surface of the end wall of the housing, and in the positioning, the positioning accuracy and the moderation feeling can be enhanced by the resilient engagement between the steep angle tapered portion and the positioning bore.

According to a fifteenth aspect and feature of the present invention, in addition to one of the first to fifth features, the housing and the cover have pluralities of recessed and projecting engage portions provided therein for retaining the cover at a given position on the housing.

With the fifteenth feature of the present invention, the cover can be mounted to the housing without use of a special coupling member, thereby providing a simplification of the structure, an enhancement in assemblability and a reduction in cost.

According to a sixteenth aspect and feature of the present invention, in addition to the sixth feature, the electromagnetic actuator includes a pair of terminal members each comprised of a connecting plate which is disposed around the outer periphery of the end of the bobbin and to which an end terminal of the coil is connected, and a coupler terminal disposed within the coupler housing, the connecting plate and the coupler terminal being integrally connected to each other through an intermediate plate which is mold-coupled to the bobbin and the coupler housing; and a noise-preventing diode connected between the connecting plates of both the terminal members.

With the sixteenth feature of the present invention, an energizing circuit and a noise-preventing circuit can be formed between the coupler terminal and the coil only be connecting the end terminal of the coil and the noise-preventing diode to the connecting plates. Thus, the electromagnetic actuator is of a simple structure and is easy to manufacture.

According to a seventeenth aspect and feature of the present invention, in addition to the sixteenth feature, the intermediate plate of each of the terminal members is provided with a coupling bore in which the terminal members is provided with a coupling bore in which a synthetic resin surrounding the intermediate plate is filled.

With the seventeenth feature of the present invention, the strength of coupling between the intermediate plate and the bobbin as well as the coupler housing can be increased by filling the synthetic resin in the coupling bore to prevent the looseness of the terminal member due to the removal.

According to an eighteenth aspect and feature of the present invention, in addition to one of the first to fifth features, the electromagnet actuator further includes a return spring for biasing the movable core away from the stationary core, and a proximity limiting means for limiting the proximity distance between both the cores in order to define an attracting force sharp-increase starting point or a point near and short of the starting point upon excitation of the coil as an operation limit of the movable core.

With the eighteenth feature of the present invention, the movable core can be always operated in a gradually increased attracting force range and hence, the variation in attracting force due to a dimensional error of each of portions is extremely small. Thus, it is possible to provide a constantly stable attracting force characteristic.

According to an nineteenth aspect and feature of the present invention, in addition to the eighteenth feature, the proximity limiting means comprises a resilient stopper which is interposed between the axially opposed surfaces of the stationary and movable cores.

With the nineteenth feature of the present invention, an operational shock force of the movable core can be absorbed by the resilient deformation of the resilient stopper to prevent the generation of a striking sound.

According to a twentieth aspect and feature of the present invention, in addition to the nineteenth feature, the stationary core is provided with a tapered bore which opens into an end face of the stationary core, and a recess connected to a smaller-diameter portion of the tapered bore, and the movable core is provided with a tapered shaft received in the tapered bore, and a headed small shaft which protrudes from an end face of the tapered shaft; and the resilient stopper abutting against a bottom surface of the recess to limit the proximity distance between both the cores is mounted to the small shaft.

With the twentieth feature of the present invention, an area of the opposed faces of both the cores is retained to be large, enabling the relatively large resilient stopper to be mounted, and moreover, the resilient stopper can be easily and reliably mounted to the movable core.

According to a 21st aspect and feature of the present invention, in addition to the twentieth feature, the resilient stopper has a projection formed on its end face.

With the 21st feature of the present invention, it is possible to prevent the sticking of the resilient stopper to the bottom surface of the recess at the operation limit of the movable core and to promptly perform the returning movement of the movable core by the return spring.

According to a 22nd aspect and feature of the present invention, in addition to the eighteenth feature, the return spring comprises a tapered coil spring.

With the 22nd feature of the present invention, the return spring can exhibit a non-linear spring characteristic to decrease a variation in difference between the attracting force between both the cores and the load of the return spring during stroking of the movable core to suppress an increase in operational shock force of the movable core to the utmost.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
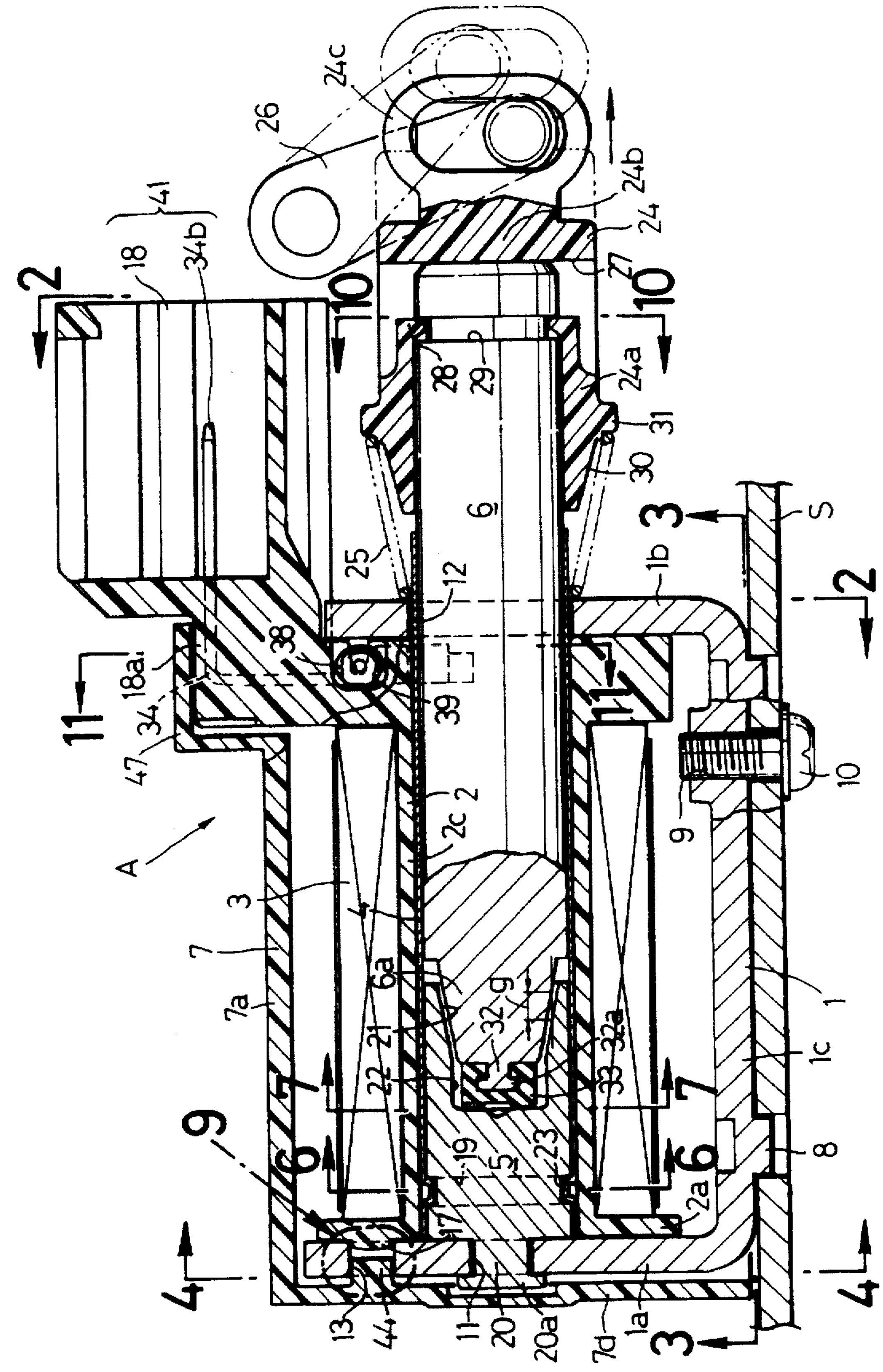
FIG. 1 is a vertical sectional side view (a sectional view taken along a line 1—1 in FIG. 2) of an electromagnetic actuator according to an embodiment of the present invention.
Figure 2:
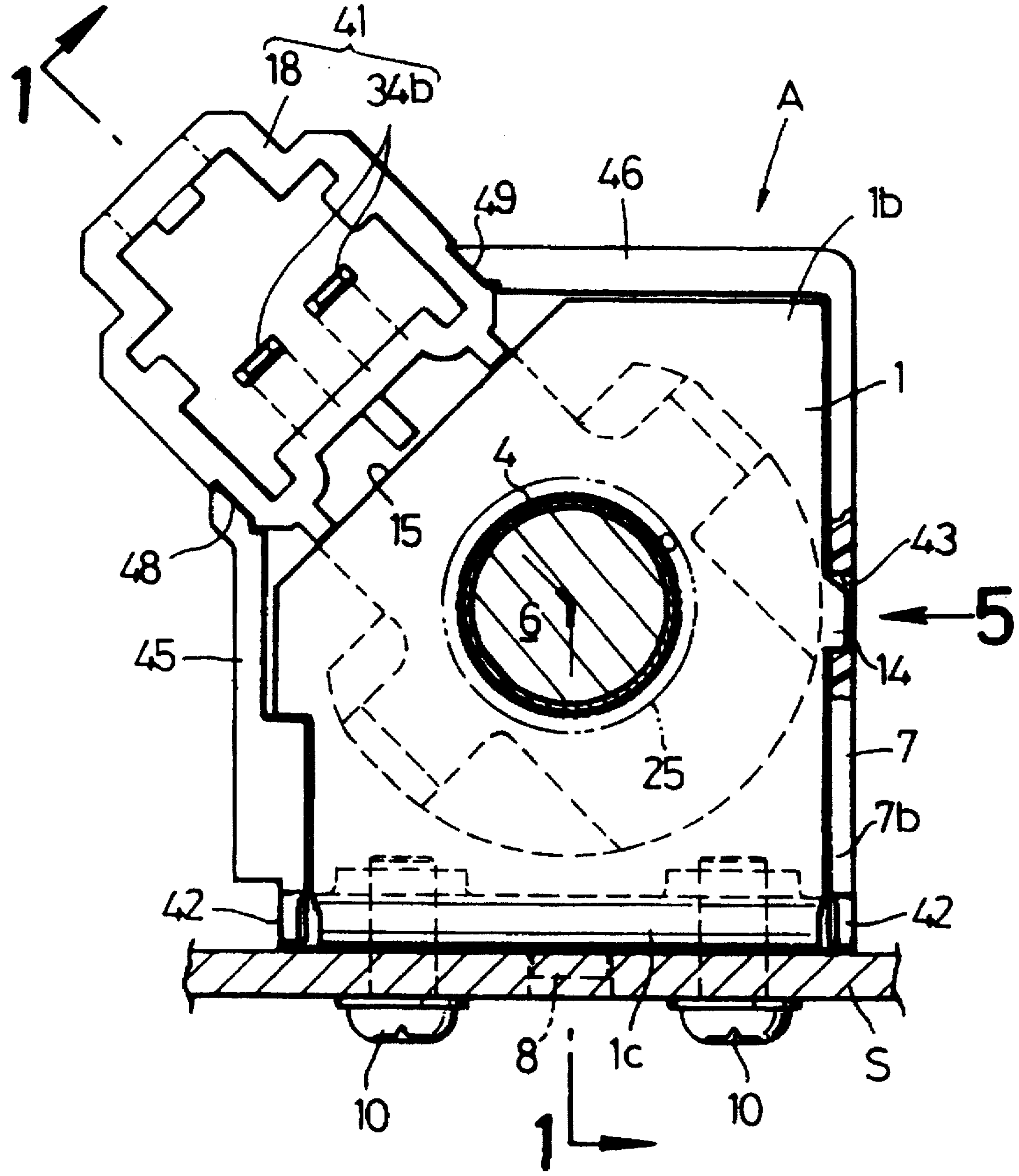
FIG. 2 is a sectional view taken along a line 2—2 in FIG. 1.
Figure 3:
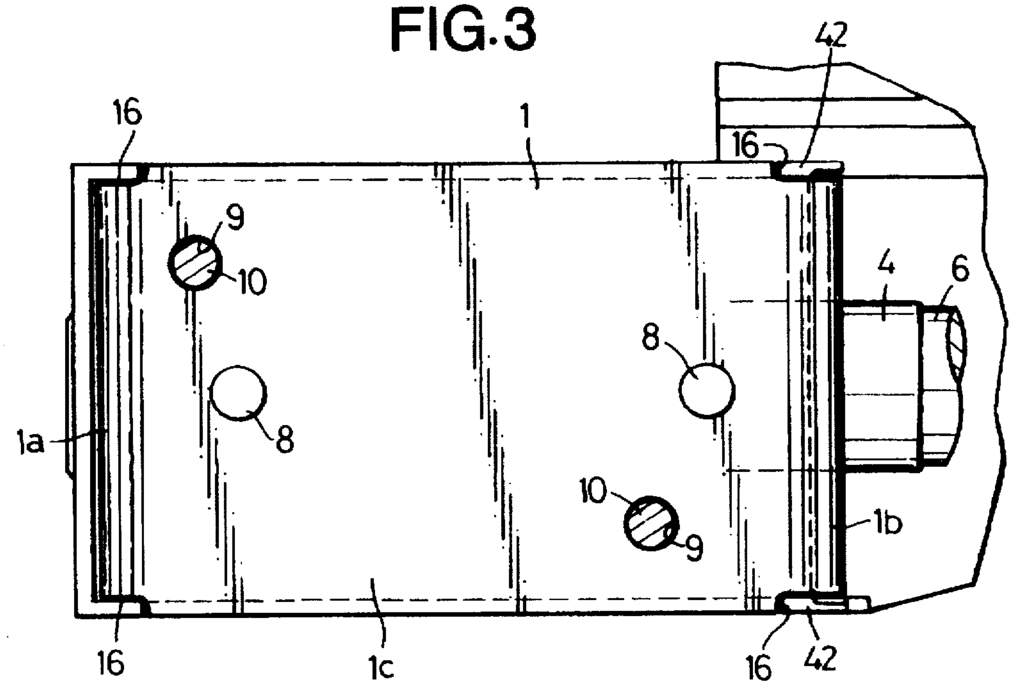
FIG. 3 is a sectional view taken along a line 3—3 in FIG. 1.
Figure 4:
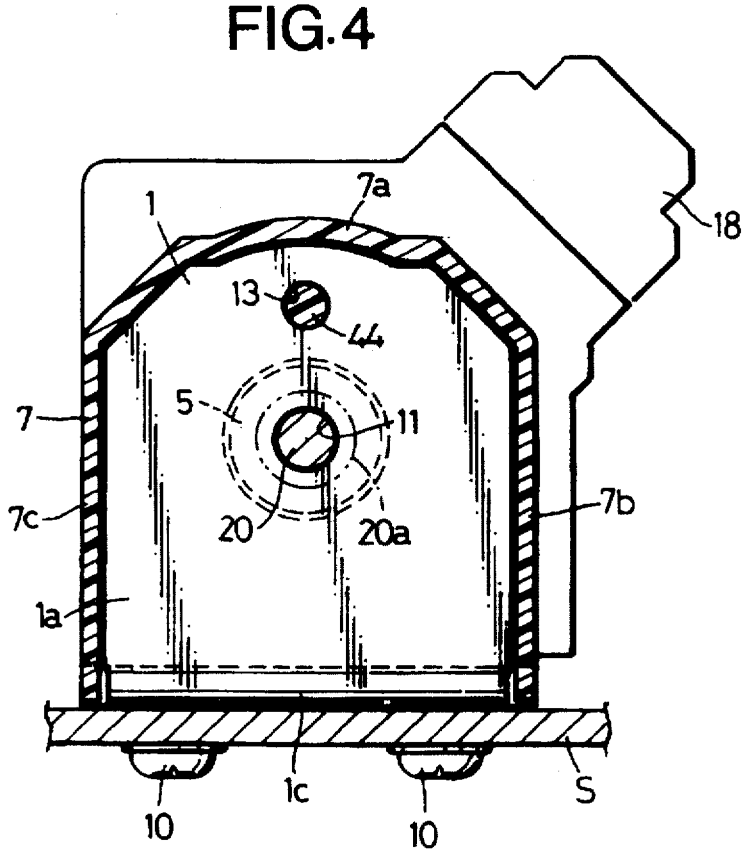
FIG. 4 is a sectional view taken along a line 4—4 in FIG. 1.

Referring to FIG. 1, an electromagnetic actuator A includes a housing 1, a bobbin 2, a coil 3, a guide sleeve 4, a stationary core 5, a movable core 6 and a cover 7 as primary elements.

Figure 12:
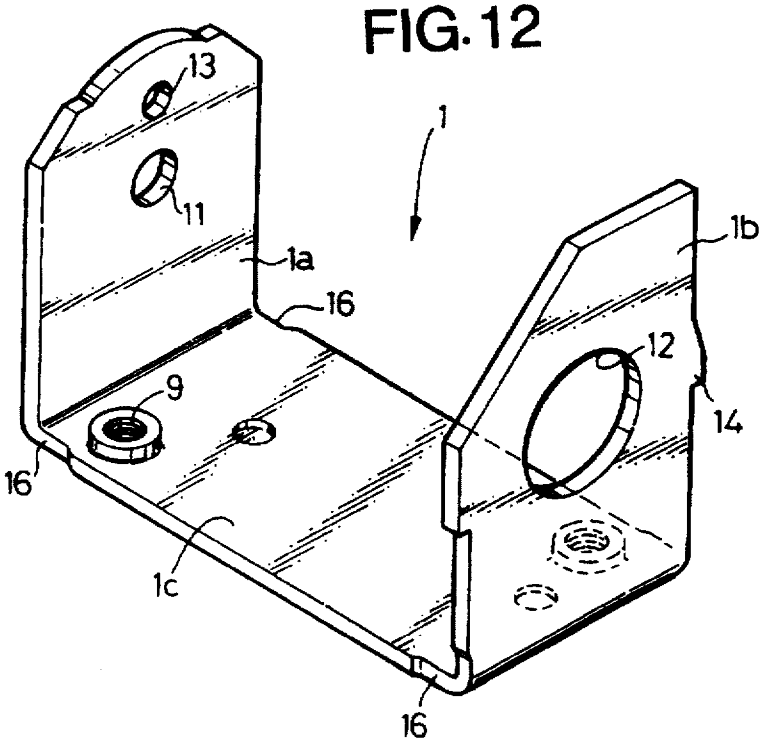
FIG. 12 is a perspective view of a housing.

As shown in FIGS. 1 and 12, the housing 1 is made by pressing a single magnetic steel sheet into an angular U-shape, and includes left and right opposed end walls 1*a* and 1*b*, and a sidewall 1*c* which interconnects the left and right end walls 1*a* and 1*b*. The sidewall 1*c* is provided with a positioning projection 8 and a mounting bore 9, and the electromagnetic actuator A is secured to a suitable support S at a given location by utilizing the positioning projection 8 and the mounting bore 9. The left end wall 1*a* of the housing 1 has a smaller-diameter support bore 11 provided at its central portion, and a positioning bore 13 defined sideways of the smaller-diameter support bore 11, and the right end wall 1*b* has a larger-diameter support bore 12 provided therein coaxially with the smaller-diameter support bore 11, a locking claw 14 formed sideways of the larger-diameter support bore 12, and a positioning slant 15 formed at its tip end corner.

Notches 16 are provided on opposite end faces of bent portions between the end walls 1*a* and 1*b* and the sidewall 1*c* of the housing 1. The notches 16 are previously formed when the housing 1 is of a flat plate-like shape and hence, when the bent portions are formed between the end walls 1*a* and 1*b* and the sidewall 1*c*, the protrusion of the opposite ends of such bent portions can be prevented.

The bobbin 2 is made of a synthetic resin and is comprised of a circuit body 2*c* around which the coil 3 is wound, a thin flange 2*a* connected to a left end of the circular body 2*c*, and a thick flange 2*b* connected to a right end of the circular body 2*c*. The inside diameter of the circular body 2*c* is set at a value substantially equal to that of the larger-diameter support bore 12, and the distance between outer surfaces of the flanges 2*a* and 2*b* is set at a value substantially equal to the distance between inner surfaces of both the ends 1*a* and 1*b* of the housing 1. A positioning projection 17 is integrally formed on the outer surface of the thin flange 2*a* and capable of being fitted into the positioning bore 13. A coupler housing 18 is integrally connected to an outer peripheral edge of the thick flange 2*b* and extends axially outwards of such outer peripheral edge. The coupler housing 18 is formed integral with the bobbin 2.

By inserting the bobbin 2 into between both the end walls 1*a* and 1*b* of the housing 1, the thin flange 2*a* of the bobbin 2 is brought into close contact with the inner surface of the left end wall 1*a* of the housing 1, while the thick flange 2*b* is brought into close contact with the inner surface of the right end wall 1*b*. Further, the positioning projection 17 is fitted into the positioning bore 13, and the coupler housing 18 is put into abutment against the positioning slant 15. In this manner, the circular body 2*c* of the bobbin 2 is positioned coaxially with the larger and smaller support bores 11 and 12 in the housing 1.

Figure 9:
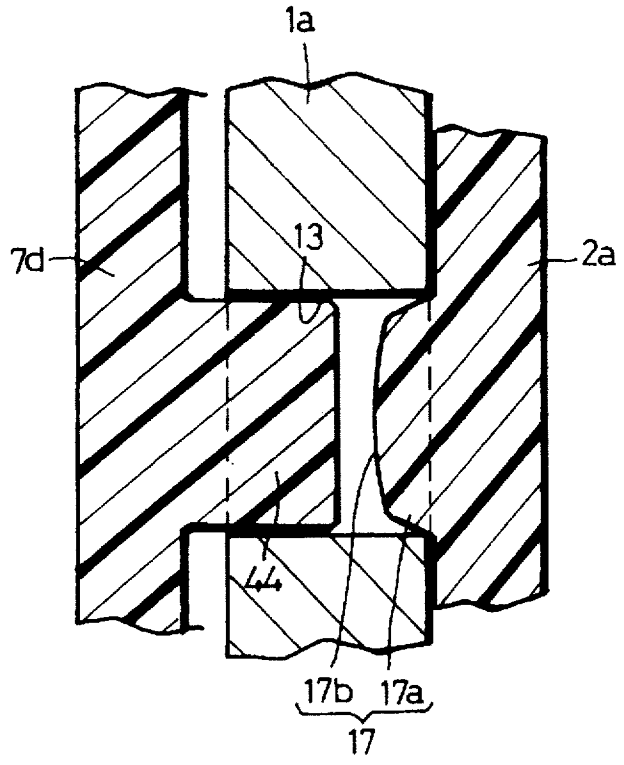
FIG. 9 is an enlarged view of a portion indicated by 9 in FIG. 1.

The positioning projection 17 of the bobbin 2 is comprised of a tapered portion 17*a* a rising at a relatively sharp angle from the outer surface of the thin flange 2*a*, and a profiled portion 17*b* of a gentle angle connected to a smaller-diameter end of the tapered portion 17*a*, as shown in FIG. 9, and is formed into a bowl-like shape as a whole. Thus, when the bobbin 2 is inserted into the housing, the positioning projection 17 is smoothly slid on the inner surface of the left end wall 1*a* of the housing 1, while slightly resiliently deforming the thin with a high positioning accuracy and with a good moderation feeling.

The height of the positioning projection 17 is set at a sufficiently small value, as compared with the depth of the positioning bore 13. Thus, the positioning bore 13 can be also fitted over a positioning projection 44 (which will be described hereinafter) of the cover 7 from the side opposite from the projection 17.

The guide sleeve 4 made of a non-magnetic metal is fitted into the circular body 2*c* of the bobbin 2 and the larger-diameter support bore 12 in the housing 1, and the stationary core 5 and the movable core 6 are disposed within the guide sleeve 4.

Figure 6:
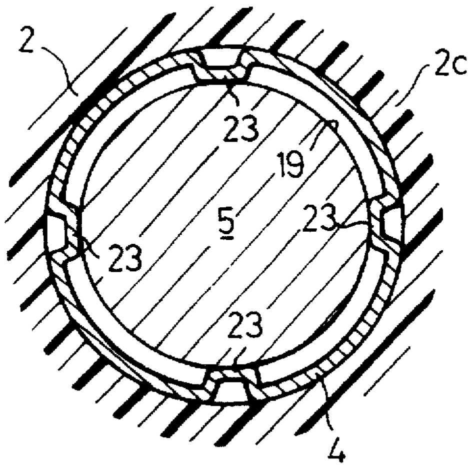
FIG. 6 is a sectional view taken along a line 6—6 in FIG. 1.

As shown in FIGS. 1 and 6, the stationary core 5 assumes a columnar shape and has an annular groove 19 defined around an outer periphery at one end thereof, and a small shaft 20 formed on one end face thereof. Further, the stationary core 5 is provided, at the other end thereof, with a tapered bore 21 which opens into the end face thereof, and a recess 22 connected to a smaller-diameter end of the tapered bore 21. The stationary core 5 is closely fitted to an inner peripheral surface at one end of the guide sleeve 4, and several caulking projections 23 bulged form the inner peripheral surface of the sleeve 4 are locked in the annular groove 19 by caulking a portion of the sleeve 4 corresponding to the annular groove 19 at several points. If such a caulking coupling is performed, the formation of the caulking projections 23 can be achieved with a relatively little caulking force, and the distortion of the guide sleeve 4 and the stationary core 5 can be prevented, thereby assuring the coaxiality of the guide sleeve 4 and the stationary core 5.

The stationary core 5 is disposed with the small shaft 20 thereof being inserted through the smaller-diameter support bore 11 in the left end wall 1*a* of the housing 1 to become into close contact with the inner surface of the end wall 1*a*. The outer end of the small shaft 20 is formed into an expanded portion 20*a* by the caulking. In this manner, the stationary core 5 is secured to the left end wall 1*a* of the housing 1. Therefore, the guide sleeve 4 is fixed to the housing 1 through the stationary core 5.

The other end of the guide sleeve 4 is loosely fitted in the larger-diameter support bore 12 in the right end wall 1*b* of the housing 1 and protrudes over a long distance outwards from the right end wall 1*b*. This protrusion increases the support span of the guide sleeve 4 for the movable core 6 and enables the inclination of the movable core 6 to be inhibited to the utmost. The loose fitting of the guide sleeve 4 into the larger-diameter support bore 12 contributes to the absorption of an error of the coaxiality of the guide sleeve 4 and the stationary core 5.

The movable core 6 assumes a plunger-like shape and is slidably fitted into the guide sleeve 4. A joint member 24 is mounted to an outer end of the movable core 6 protruding from the guide sleeve 4, and a return spring 25 is mounted under compression between the joint member 24 and the right end wall 1*b* of the housing 1 for biasing the movable core 6 away from the stationary core 5. That is, the return spring 25 is mounted around the movable core 6.

Figure 10:
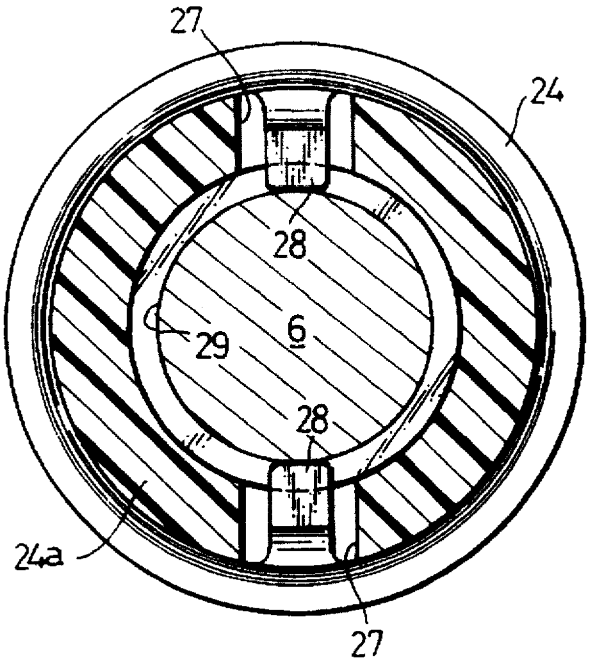
FIG. 10 is a sectional view taken along a line 10—10 in FIG. 1.

As shown in FIGS. 1 and 10, the joint member 24 is made of a synthetic resin and comprised of a cylindrical portion 24*a* at one end, and an eye portion 24*c* protruding from the end wall 24*b* of the cylindrical portion 24*a*. The cylindrical portion 24*a* is coupled in a press-fitted manner to the outer peripheral surface of the movable core 6 at the outer end thereof, and an operated member 26 is connected to the eye portion 24*c*. The cylindrical portion 24*a* is integrally provided a plurality of lateral bores 27, and locking claws 28 made by bending claw portions at tip ends radially inwards to face the lateral bores 27. When the outer end face of the movable core 6 press-fitted into the cylindrical portion 24*a* is put into abutment against the end wall 24*b*, it is engaged in the annular groove 29 around the outer periphery of the movable core 6 with its own resilient force. Therefore, even if the press-fitting coupling between the cylindrical portion 24*a* and the movable core 6 should be loosened, the disengagement of the joint member 24 can be prevented.

Further, a tapered portion 30 and a flange 31 rising from a larger-diameter end of the tapered portion 30 are formed on an outer peripheral surface of the cylindrical portion 24*a* of the joint member 24 an inner end thereof. On the other hand, the return spring 25 is formed of a coil spring, particularly, a tapered coil spring and has a smaller-diameter end fitted over the outer periphery of the guide sleeve 4 and carried on the right end wall 1*b* of the housing 1, and a larger-diameter end fitted over the larger-diameter part of the tapered portion 30 and carried on the flange 31. The tapered portion 30 guides the setting of the larger-diameter end of the return spring 24 to a given position, and a tapered angle larger than the tapered angle of the spring 25 is provided to the tapered portion 30 in order to avoid the interference with the return spring 25 when the return spring 25 is expanded or compressed.

Figure 15:
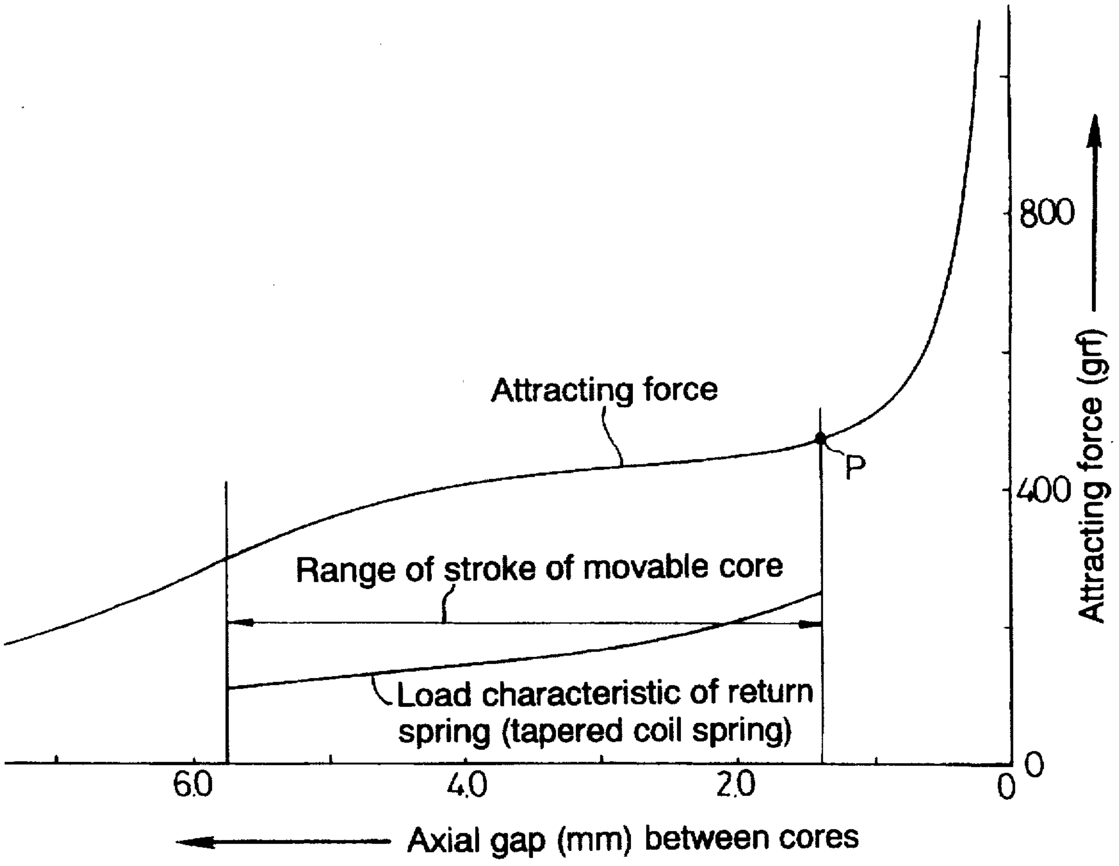
FIG. 15 is a diagram of a stroke/attracting force characteristic lines of the electromagnetic actuator.

The return spring 25 mounted around the movable core 6 can be formed at a sufficient larger diameter so that it is not interfered by the other member and hence, a low spring constant can be generally provided to the return spring 25, while shortening the axial length thereof. Especially, by use of the tapered coil spring, the return spring 25 can possess a non-linear characteristic as shown in FIG. 15. More specifically, the return spring 25 has a characteristic that it has a lower spring constant in the first half of the compression thereof and a higher spring constant in the second half of the compression. Moreover, the return spring 25 is supported by the guide sleeve 4 and the larger-diameter part of the tapered portion 30 and hence, when the return spring 25 is compressed, a falling or buckling is not produced.

Figure 7:
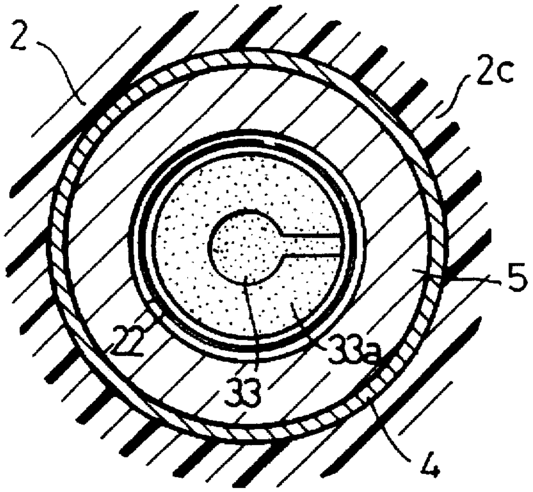
FIG. 7 is a sectional view taken along a line 7—7 in FIG. 1.
Figure 8:
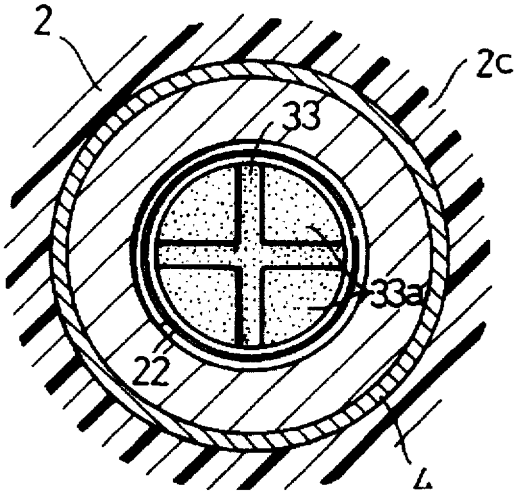
FIG. 8 is a sectional view corresponding to FIG. 7, but illustrating a variant of a resilient stopper.

Referring again to FIG. 1, the movable core 6 has, at its inner end, a tapered shaft 6a corresponding to the tapered bore 21 in the stationary core 5. A small shaft 32 having an expanded head portion 32a is projectingly provided on an end face of the tapered shaft 6a, and a resilient stopper 33 made of a rubber or the like is mounted to the small shaft 32. The resilient stopper 33 is adapted to be put into abutment against a bottom surface of the recess 22 of the stationary core 5 to limit the proximity distance g of the movable core 6 to the stationary core 5 to a given value, wherein a shock of such abutment is absorbed by the compressive deformation of the resilient stopper 33 itself. A C-shaped or cross-shaped projection 33a as shown in FIGS. 7 and 8 is formed on an end face of the resilient stopper 33 to prevent the sticking of the resilient stopper 33 when the latter has been put into abutment against the bottom surface of the recess 22.

If an electric current is now supplied to the coil 3 to excite the latter, an attracting force is generated between the stationary and movable cores 5 and 6 by a magnetic flux flowing to the stationary and movable cores 5 and 6, whereby the movable core 6 is moved from a position shown by a dashed line in FIG. 1 toward the stationary core 5 while compressing the return spring 25 to operate the operated member 26. At this time, the proximity distance g between both the cores 5 and 6 is limited to a particular value by abutment of the resilient stopper 33 of the movable core 6 against the bottom surface of the recess 22.

As shown in FIG. 15, the attracting force between both the cores 5 and 6 is gradually increased until the axial distance between both the cores 5 and 6 is decreased to the particular value, and when the axial distance is decreased to be lower than such particular value, the attracting force is sharply increased. Thus, the movable core 6 can be operated while sufficiently assuring the stroke of the movable core 6 under a relatively stable attracting force by limiting the proximity distance between both the cores 5 and 6 to the particular value as described above in order to define a starting point P of the sharp increase in attracting force or a near point short of the starting point P as an operation limit of the movable core 6. Therefore, a driving force for the operated member 26 can be stabilized regardless of the dimensional error of the resilient stopper 33 and the recess 22.

In this case, the tapered coil spring having the non-linear characteristic as described above is used as the return spring 25 and hence, during stroking of the movable core 6, a variation in difference between the attracting force between both the cores 5 and 6 and the load of the return spring 25 is small, and an increase in shock force of operation of the movable core 6 can be suppressed to the utmost.

In addition, the guide sleeve 4 is secured directly to the stationary core 5 and hence, even if the guide sleeve 4 receives a side thrust from the movable core 6, the coaxiality between the guide sleeve 4 and the stationary core 5 cannot get out of order. Therefore, the coaxiality between both the cores 5 and 6 can be always maintained by the guide sleeve 4 to properly guide the reciprocal movement of the movable core 6 and to exhibit a stable performance.

Further, since the housing 1 is made by pressing the single magnetic steel sheet into the angular U-shape, there is no magnetic loss between the end walls 1a and 1b and the sidewall 1c, and a large attracting force can be exerted to both the cores 5 and 6.

It is not necessary to interpose a conventional resilient ring between the guide sleeve 4 and the stationary core 5 and hence, it is possible to reduce the number of parts and in its turn, to provide a simplified structure.

Figure 11:
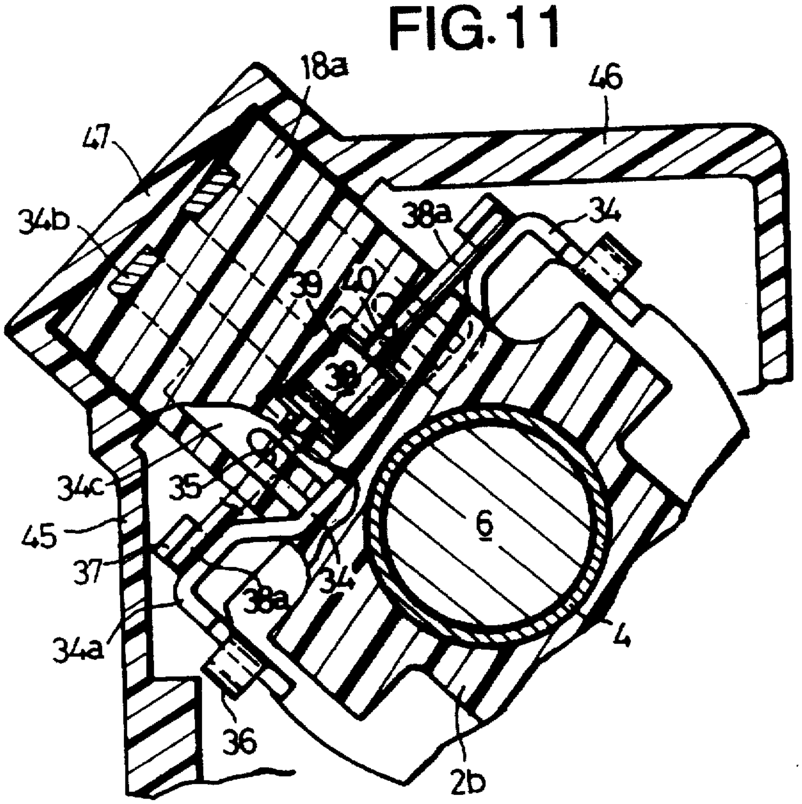
FIG. 11 is a sectional view taken along a line 11—11 in FIG. 1.
Figure 13:
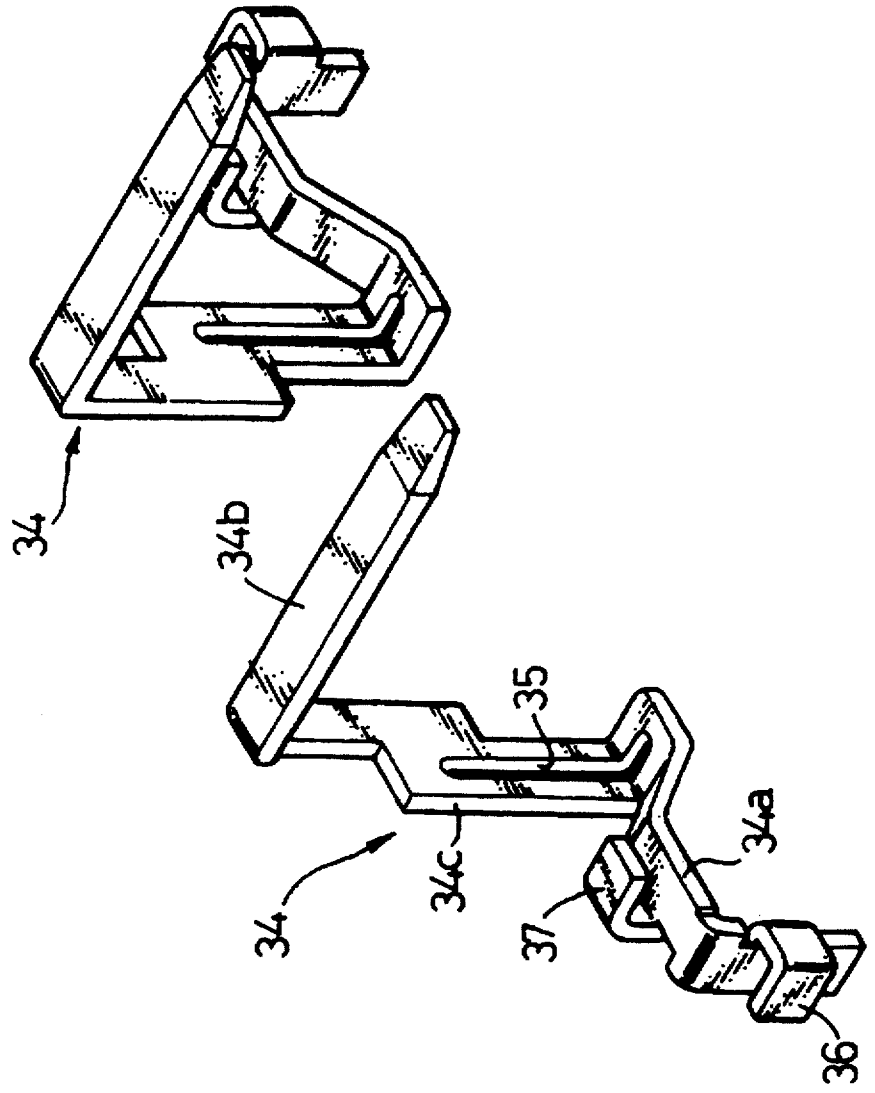
FIG. 13 is a perspective view of a terminal member.

Referring to FIGS. 1, 11 and 13, a pair of terminal members 34 are mode-coupled to extent from the thick flange 2b of the bobbin 2 to the coupler housing 18. Each of the terminal members 34 is made by pressing a single conductive plate and comprised of a connecting plate 34a disposed around the outer periphery of the thick flange 2b, a coupler terminal 34b disposed within the coupler housing 18, and an intermediate plate 34c which connects the connecting plate 34a and the coupler terminal 34b to each other. The intermediate plate 34c has a coupling bore 35. The intermediate plate 34c is mold-coupled to the thick flange 2b and the coupler housing 18 and hence, by filling the coupling bore 35 with a synthetic resin surrounding the intermediate plate 34c the coupling of the intermediate plate 34c to the thick flange 2b and the coupler housing 18 is reinforced.

The connecting plate 34a of each terminal member 34 includes a pair of connecting pieces 36 and 37 arranged circumferentially of the thick flange 2b, and a terminal of the coil 3 is caulked and electro-deposited to the connecting piece 36 on a tip end side. A terminal rod 38a of a noise-preventing diode 38 is caulked and electro-deposited to the other connecting piece 37. A recess 39 and a recessed groove 40 for accommodating the diode 38 and its terminal rod 38a are formed in the outer end face of the thick flange 2b and have openings which are closed by the right end wall 1b of the housing 1 which is in close contact with the outer end face of the thick flange 2b. Thus, the diode 38 can be protected from the contact with another object and the entering of dusts.

The coupler housing 18 and the pair of coupler terminals 34b constitute a coupler 41 to which a coupler of a power source (not shown) is connected.

Figure 5:
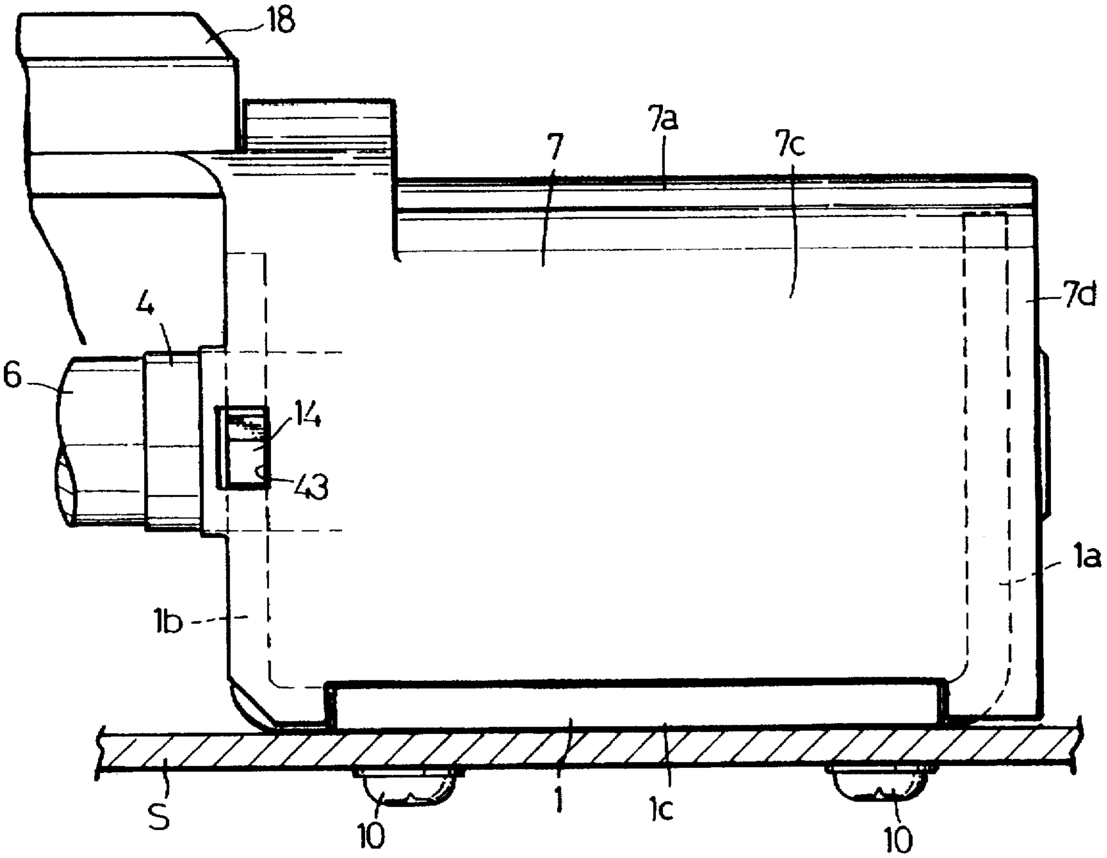
FIG. 5 is a sectional view taken along an arrow 5 in FIG. 2.

Referring to FIGS. 1 and 5, the cover 7 made of a synthetic resin for covering the coil 3 to guard the coil 3 from rain water and dusts in mounted to the housing 1. The cover 7 has a ceiling wall 7a, a pair of sidewalls 7b and 7c and an end wall 7d, which cover four faces excluding the right end wall 1b and the sidewall 1c of the housing 1. A locking claw 42 capable of being engaged into the pair of notches 16 in the right end wall 1b of the housing 1 if formed on an end edge of each of the sidewalls 7b and 7c; a locking bore 43, into which the locking claw 14 of the housing 1 can be engaged, is defined in the sidewall 7c; and the positioning projection 44 capable of being engaged into the positioning bore 13 in the housing 1 is formed on the end wall 7d.

Thus, if the housing 1 is inserted into the cover 7 from the side of the left end wall 1a, the positioning projection 44 is fitted into the positioning bore 13, whereby the left end wall 1a of the housing 1 is put into abutment against the end wall of 7d of the cover 7, while at the same time, the locking claw 42 is resiliently engaged into the notch 16 in the right end wall 1b of the housing 1, and the locking claw 14 is resiliently engaged into the locking bore 43. In this manner, the cover 7 is mounted at a given position on the housing 1 without use of a fixing member such as a machine screw or the like.

The ceiling wall 7*a* and one of the sidewalls 7*b* of the cover 7 are integrally provided with a pair of reinforcing plates 45 and 46 disposed with the coupler housing 18 interposed therebetween, and a reinforcing corner portion 47 fitted over the a stepped neck portion 18*a* of the coupler housing 18 and interconnecting the reinforcing plates 45 and 46.

On the other hand, groove-like guide rails 48 and 49 are formed on the outer surface of the coupler housing 18, and opposed side edges of both the reinforcing plates 45 and 46 are slidably engaged with the groove-like guide rails 48 and 49 in a direction of insertion of the housing 1 into the cover 7.

Thus, when the housing 1 is inserted into the cover 7, the mounting of the cover 7 can be easily performed by bringing the pair of reinforcing plates 45 and 46 into engagement with the guide rails 48 and 49 while sliding them. Moreover, since the coupler housing 18 is clamped by both the reinforcing plates 48 and 49 with the stepped neck portion 18*a* being fitted into the reinforcing corner portion 47, the coupler housing 18 can be effectively reinforced by the reinforcing plates 45 and 46 and the reinforcing corner portion 47. Therefore, the coupler 41 can sufficiently withstand a load of insertion from the power source coupler and a flexural load.

Figure 14A:
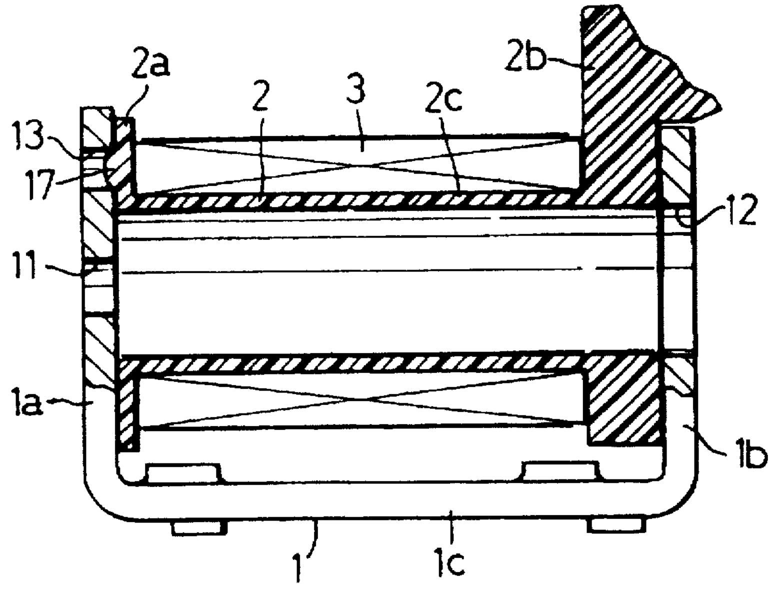
FIGS. 14A, 14B and 14C are views for illustrating steps of assembling the electromagnetic actuator.
Figure 14B:
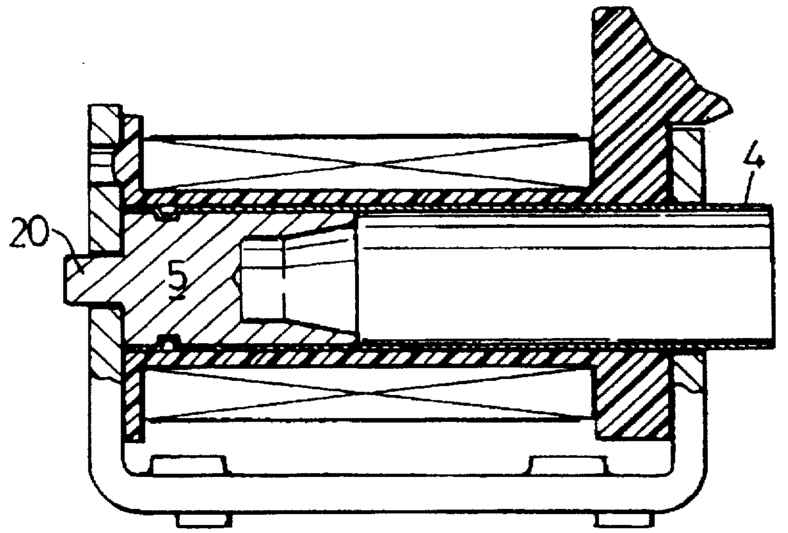
Figure 14C:
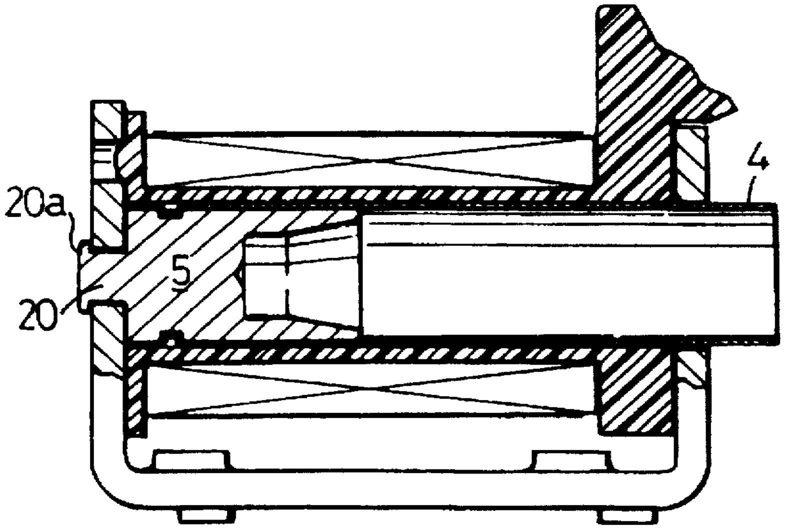

In the assembling of such electromagnetic actuator A, the assembly of the bobbin 2 and the coil 3 including the coupler 41 is first inserted into the housing 1, as shown in FIG. 14A, and then, the guide sleeve 4 caulked to the stationary core 5 is inserted into the larger-diameter support bore 12 of the housing 1 and the circular body 2*c* of the bobbin 2, while the small shaft 20 of the stationary core 5 is inserted into the smaller-diameter support bore 11 in the housing 1, as shown in FIG. 14B. Then, as shown in FIG. 14C, the outer end of the small shaft 20 is caulked to form the enlarged portion 20*a*, and the stationary core 5 is secured to the housing 1. Then, as shown in FIG. 1, the cover 7 is mounted to the housing 1 and finally, the movable core 6 with the joint member 24 attached thereto is fitted into the guide sleeve 4 in such a manner that the return spring 25 is sandwiched between the movable core 6 and the housing 1.

In such assembling steps, especially, the disengagement of the guide sleeve 4 and the bobbin 2 from the housing 1 can be inhibited at once by caulking the stationary core 5 to the housing 1, leading to a reduced number of assembling steps, and an enhanced efficiency of the assembling operation.

Although the embodiment of the present invention has been described in detail, it will be understood that the present invention is not limited to the above-described embodiment, and various modifications in design may be made without departing from the spirit and scope of the invention defined in claims. For example, the stationary core and the guide sleeve may be coupled by welding, brazing or the like in place of caulking.

What is claimed is:

1. An electromagnetic actuator comprising a bobbin which is disposed between opposite end walls of a housing made of a magnetic material and which has a coil wound therearound, a guide sleeve which is fitted to an inner periphery of said bobbin and which is opposed at one end thereof to one of said end walls of said housing and fitted at the other end thereof into a support bore in the other end wall of said housing, a stationary core fitted into said guide sleeve and caulked to the one end wall of said housing, and a movable core slidably fitted into said guide sleeve and cooperating with said stationary core, wherein said guide sleeve is placed into close contact with an outer peripheral surface of said stationary core and fixedly coupled thereto.

2. An electromagnetic actuator according to claim 1, wherein said guide sleeve protrudes out of the other end wall of said housing.

3. An electromagnetic actuator according to claim 1 or 2, wherein said guide sleeve is caulked from its outer periphery and coupled to said stationary core.

4. An electromagnetic actuator according to claim 3, wherein said stationary core has an annular groove which is defined around the outer periphery of said stationary core, and into which a caulked projection formed by caulking the guide sleeve from its outer periphery is engaged.

5. An electromagnetic actuator comprising a bobbin which is disposed between opposite end walls of a housing made of a magnetic material and which has a coil wound therearound, a guide sleeve which is fitted to an inner periphery of the bobbin and which is opposed at one end thereof to one of said end walls of said housing and fitted at the other end thereof into a support bore in the other end wall of said housing, a stationary core fitted into said guide sleeve and caulked to the one end wall of said housing, and a movable core slidably fitted into said guide sleeve and cooperating with said stationary core, wherein said housing made by pressing a magnetic steel plate into an angular U-shape has a smaller-diameter support bore and a larger-diameter support bore defined in one and the other of said end walls, respectively, and said guide sleeve is fitted into said larger-diameter support bore and to the inner peripheral surface of said bobbin interposed between both said end walls, said guide sleeve being fixedly coupled to said stationary core which is in close contact with the inner peripheral surface of an end of said guide sleeve, and said stationary core has a small shaft protruding from an outer end thereof, said small shaft being fitted into and caulked in said smaller-diameter support bore and coupled to said one end wall.

6. An electromagnetic actuator according to claim 1, 2, or 5, wherein said housing having the opposite end walls is formed by pressing a magnetic steel sheet into an angular U-shape; said bobbin interposed between the opposite end walls and a coupler housing extending from a peripheral edge of one end of said bobbin to the outside of said housing are integrally formed from a synthetic resin, and a coupler terminal connected to said coil wound around the bobbin is disposed within said coupler housing, thereby forming a coupler.

7. An electromagnetic actuator according to claim 6, further including a cover made of synthetic resin and mounted to said angular U-shaped housing to cover said coil by cooperation with said other end wall of said housing.

8. An electromagnetic actuator according to claim 7, wherein said cover has a pair of reinforcing plates integrally formed thereon for clamping opposite sides of said coupler housing.

9. An electromagnetic actuator according to claim 8, wherein said housing is provided with a positioning portion for defining a position of said coupler housing with respect to said housing, and said coupler housing has guide rails formed in its opposite sides, so that both the reinforcing plates are slidably engaged with the guide rails in a direction of insertion of the housing into the cover.

10. An electromagnetic actuator according to claim 9, wherein said cover has a reinforcing corner portion integrally formed thereon, which is fitted over a stepped neck portion of said coupler housing to interconnect both said reinforcing plates.

11. An electromagnetic actuator according to claim 7, wherein said cover includes an end wall for covering said one end wall of said housing to which said stationary core is caulked and coupled.

12. An electromagnetic actuator according to claim 1, 2 or 5, wherein said housing has a positioning bore provided in said one end wall, and said bobbin has a positioning projection provided on one end face thereof opposed to said one end wall, said positioning bore and said positioning projection being resiliently engaged with each other.

13. An electromagnetic actuator according to claim 12, wherein said positioning projection is formed into a bowl-like shape.

14. An electromagnetic actuator according to claim 13, wherein said bowl-like positioning projection is comprised of a tapered portion rising at a steep angle, and a profiled portion of a gentle angle connected to a smaller-diameter end of said tapered portion.

15. An electromagnetic actuator according to claim 7, wherein aid housing and said cover have pluralities of recessed and projecting engage portions provided between themselves for retaining said cover at a given position on said housing.

16. An electromagnetic actuator according to claim 6, further including a pair of terminal members each comprising a connecting plate which is disposed around the outer periphery of the end of said bobbin and to which an end terminal of said coil is connected, and a coupler terminal disposed within said coupler housing, said connecting plate and said coupler terminal being integrally connected to each other through an intermediate plate which is mold-coupled to said bobbin and said coupler housing; and a noise-preventing diode connected between said connecting plates of both said terminal members.

17. An electromagnetic actuator according to claim 16, wherein said intermediate plate of each of said terminal members is provided with a coupling bore in which a synthetic resin surrounding said intermediate plate is filled.

18. An electromagnetic actuator according to claim 1, 2, or 5, further including a return spring for biasing the movable core away from the stationary core, and a proximity limiting means for limiting a proximity distance between both said cores in order to define an attracting force sharp-increase starting point (P) or a point near and short of said starting point upon excitation of said coil as an operation limit of said movable core.

19. An electromagnetic actuator according to claim 18, wherein said proximity limiting means comprises a resilient stopper which is interposed between the axially opposed surfaces of said stationary and movable cores.

20. An electromagnetic actuator according to claim 19, wherein said stationary core is provided with a tapered bore which opens into an end face of the stationary core, and a recess connected to a smaller-diameter portion of said tapered bore, and said movable core is provided with a tapered shaft received in said tapered bore, and a headed small shaft which protrudes from an end face of the tapered shaft; and said resilient stopper abutting against a bottom surface of the recess to limit the proximity distance between both said cores is mounted to said small shaft.

21. An electromagnetic actuator according to claim 20, wherein said resilient stopper has a projection formed on its end face.

22. An electromagnetic actuator according to claim 21, wherein said return spring comprises a tapered coil spring.

* * * * *